United States Patent [19]

Cummins

[11] Patent Number: 5,838,134
[45] Date of Patent: Nov. 17, 1998

[54] UNIVERSAL COMMUTATOR FOR A.C. MOTORS

[76] Inventor: Michael D. Cummins, 846 Raymond St. Parkview Island, Miami Beach, Fla. 33141

[21] Appl. No.: 966,961

[22] Filed: Nov. 10, 1997

[51] Int. Cl.⁶ .................................................. H02P 7/628
[52] U.S. Cl. ............................................. 318/750; 318/439
[58] Field of Search ................................... 318/138, 254, 318/439, 688, 750, 751

[56] References Cited

U.S. PATENT DOCUMENTS

| | | | |
|---|---|---|---|
| 3,780,363 | 12/1973 | Doemen et al. | 318/254 |
| 4,600,864 | 7/1986 | Sato | 318/254 |
| 5,512,809 | 4/1996 | Banks et al. | 318/778 |
| 5,710,493 | 1/1998 | Flynn | 318/254 |

Primary Examiner—Bentsu Ro
Attorney, Agent, or Firm—J. Sanchelima

[57] ABSTRACT

A commutator for A.C. shaded pole motors that permits the use of a D.C. source to provide a suitable alternating current that can be adjusted to regulate the rotational speed and compensate for the slip factor. The commutator includes a wave forming circuit that generates two triggering signals with rising and falling time that do not coincide in time. These triggering signals are transmitted to the gates of respective power switching devices to alternatively make a connection to ground of the ends of the motor winding. The motor winding includes a central tap to which a D.C. voltage is applied and the two halves are wound to induce opposite magnetic fields. The magnetic fields will thus avoid fighting or contention.

3 Claims, 3 Drawing Sheets

UNIVERSAL COMMUTATOR FOR A.C. MOTORS

BACKGROUND OF THE INVENTION

1. Field of the Invention

The present invention relates to commutators for A.C. motors, and more particularly, to the type that can be efficiently used in public power networks with different ratings for voltages as well as frequency.

2. Description of the Related Art

The electric tension characteristics in public networks vary from country to country. The logistic problems faced by manufacturers shipping their products overseas, at the very least, increases costs and in many instances limits them from entering markets that are not fully developed. Thus, the desirability of having a universal commutator, specially for driving A.C. motors.

The problems of A.C. compatibility (different frequencies), of course, are not found in the D.C. side. In fact, universal switching power supplies today are "intelligent" and sense the input A.C. voltage, adjust themselves accordingly, and provide the desired D.C. voltage out.

One of the approaches to the problem is, of course, using D.C. motors. However, D.C. motors have drawbacks not found with A.C. motors, such as, being less reliable, requiring noisy brushes with EMI/RFI problems, etc. Therefore, A.C. motors can not be easily replaced with DC motors, at least with those of comparable costs.

Another approach would be to use an uninterruptible power supply (UPS) to provide the A.C. voltage from battery sources. However, this approach has its limitations based on the capacity of the batteries.

Yet another way of solving the problem would be to use a D.C. source (provided by an inexpensive universal switching power supply), chop the voltage and pass it through a transformer. This, however, results in a bulky and expensive apparatus.

The present invention uses a D.C. power source and provides a chopped voltage that is fed directly to the A.C. motor with delays that enhance the efficiency of the A.C. motor. The applicant found that the "fighting" or "contention" in the opposite windings of A.C. motors, such as the shaded pole motors and the permanent split capacitor types, were substantial at the switching time of the square waveforms generated. By delaying slightly the rising edge of the voltage applied to one of the windings with respect to the falling edge of the voltage in the other winding, the "fighting" is eliminated, and more torque is obtained with less heat dissipation.

SUMMARY OF THE INVENTION

It is one of the main objects of the present invention to provide a commutator device that can be used in public electric power networks with different voltage and frequency ratings to power A.C. devices such as A.C. motors of the shaded pole and permanent split capacitor types.

It is another object of this invention to provide such a device that works efficiently and eliminates the conflicting electromagnetic effects found with D.C. switching voltages applied to the winding of the above mentioned A.C. motors.

It is another object of the present invention to control the frequency delivered to an A.C. motor load by controlling the frequency and thus the rotational speed.

It is another object of the present invention to provide a device that, by changing the frequency of the A.C., the inertia of the load is overcome at start up with more power applied (at a lower frequency) and after increasing the rotational speed the power delivered is reduced.

It is another object of this invention to provide a device that adjusts the speed of the motor to compensate for slip losses.

It is still another object of this invention to control an A.C. motor from a D.C. source.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
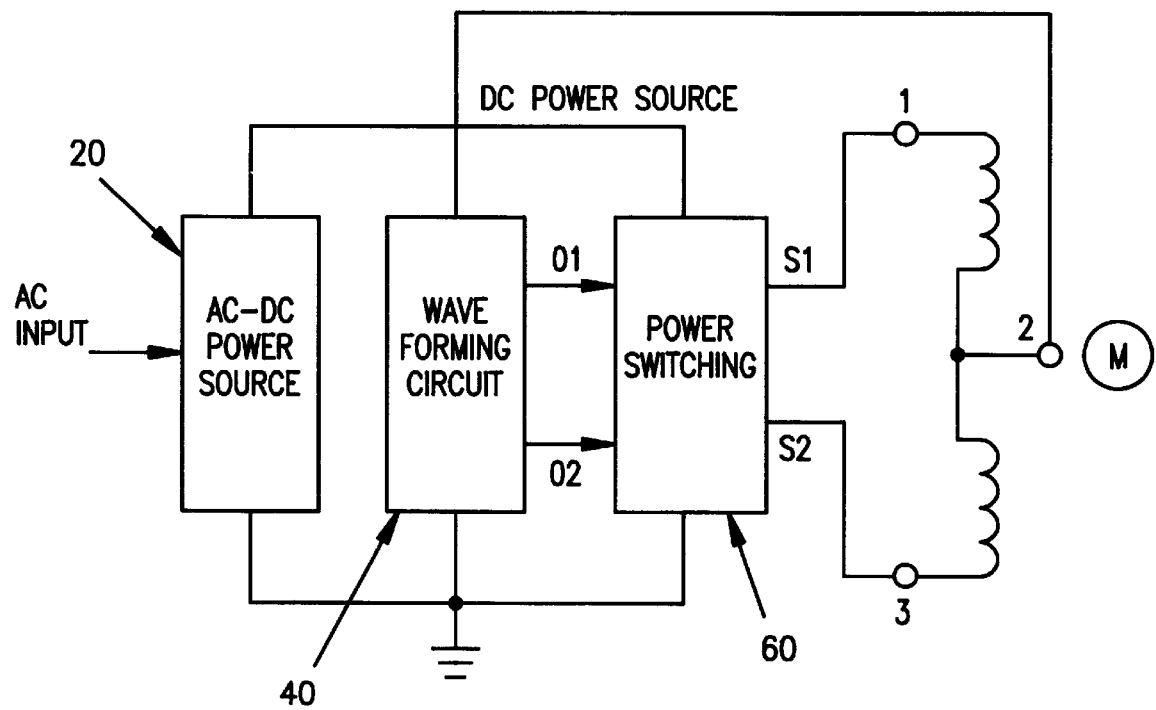
FIG. 1 is a block diagram of the present invention.
Figure 1A:
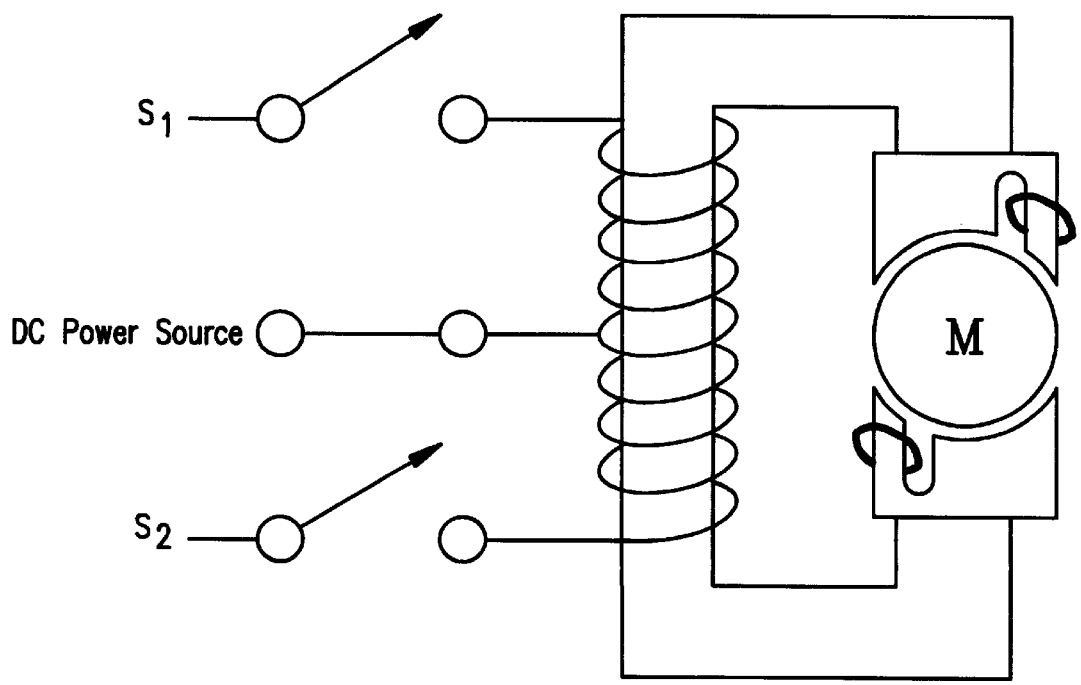
FIG. 1a is a representation of the stator and rotor of a shaded pole motor.

FIG. 1 shows the block diagram of the general principle of construction of our motor controller driving a motor. A D.C. power source 20 (derived from an A.C. to D.C. rectifier preferably) is used to derive power for the waveforming and frequency control circuitry 40. The output(s) from the waveforming circuit controls power switching circuit 60 which, in turn, drive motor M. FIG. 1a depicts the motor windings and the motor M between the motor armatures of a "shaded-pole" motor. $S_1$ and $S_2$ are the outputs of the solid state switches 61 and 62 of power switching circuits 60. We drive the motor rotation by reversing the current direction through the specially wound motor. Two windings are used in the shaded-pole motor and reverse current direction with the solid state switches. The windings have a common tap to which a D.C. voltage is applied, as seen in FIG. 1a. The other end of the windings are connected to the switching circuits that alternate in providing a ground connection thus forcing current through the windings. We can alternate the magnetic fields operating from a uni-polar (D.C.) source. Thus, we are controlling an A.C. motor from a D.C. source. Since we can control the frequency, we also control the speed. A.C. motors typically run at the line frequency speed less some "slip". As stated above, a 60 Hz line driven motor would rotate at something approaching 3600 RPM. (This is 60 cycles-per-second for 60 seconds=3600.) We can run at any speed we wish by changing the waveforming and frequency control circuitry to some desired frequency. Thus we are controlling the frequency thus controlling rotation speed.

Figure 2:
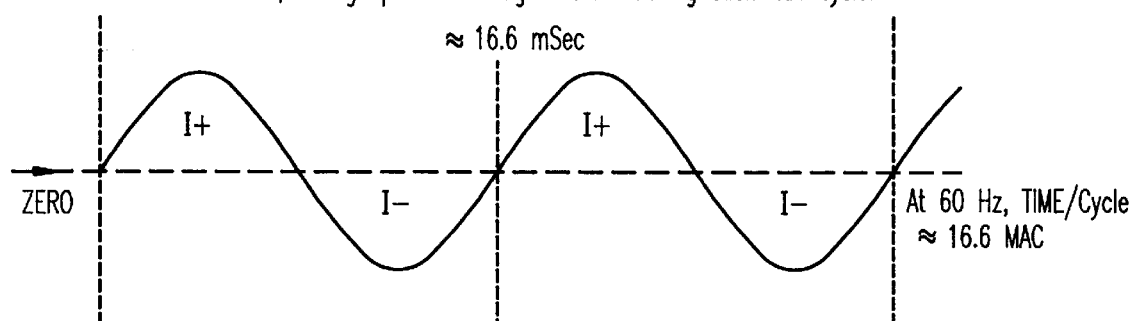
FIG. 2 represents a conventional 60 hertz waveform typical of public power networks.
Figure 2A:
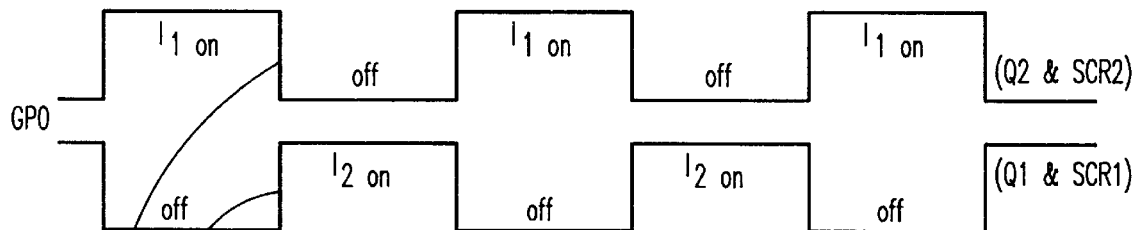
FIG. 2a is a timing chart, without the present invention, showing the "contention" between the two signals at the edges.

In an A.C. line powered device, the sinusoidal voltage travels from zero to some maximum positive voltage, then decreases through zero to some maximum negative voltage, repeating this to change current flow through a motor winding which changes the magnetic field and causes the motor to rotate. This polarity reversal and transition through zero voltage causes no contention in the motor winding(s). See FIG. 2 for a depiction of this A.C. waveform.

Figure 2B:
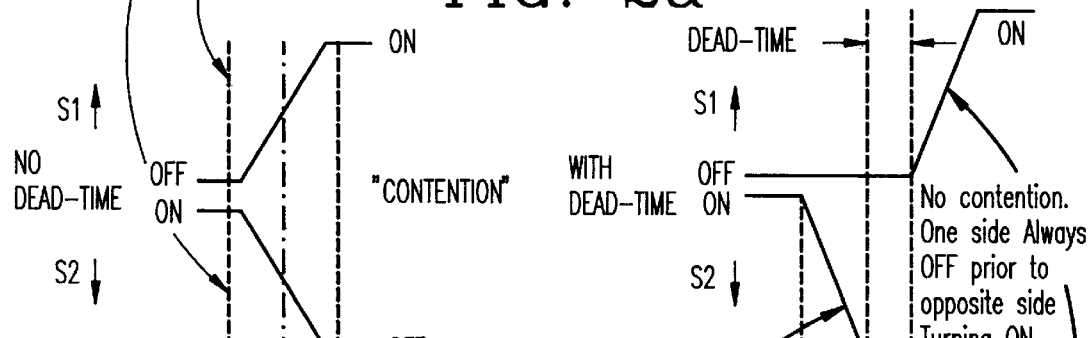
FIG. 2b is an enlarged detail of the edges showing the contention effect.
Figure 2D:
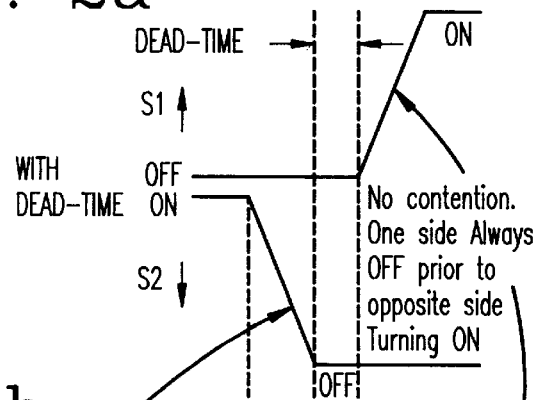
FIG. 2d is an enlarged detail of the edges where the present invention's dead time has been incorporated, eliminating the contention effect.
Figure 2C:
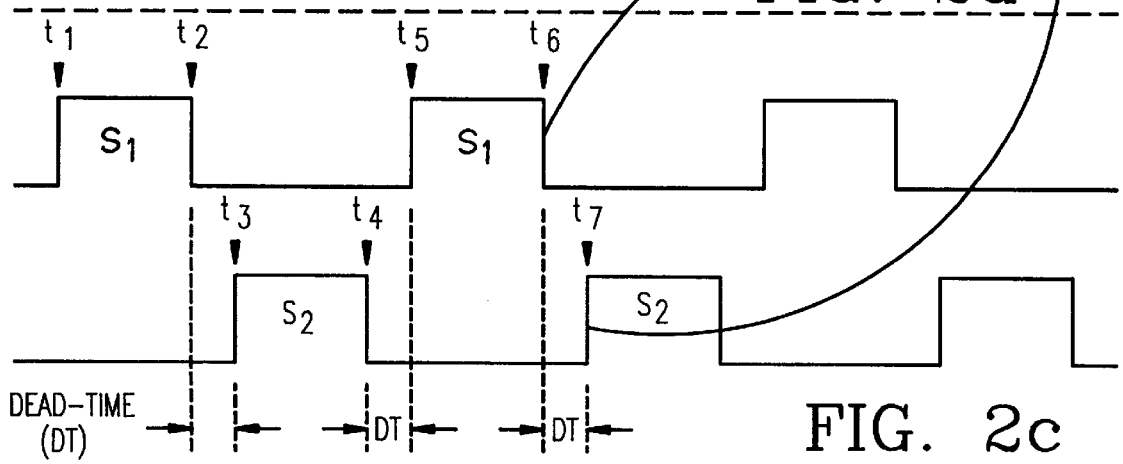
FIG. 2c is a timing chart showing the characteristics of the triggering signals generated by the waveforming logic and timing circuit in the present invention.

FIG. 2c depicts the timing of the solid state switches, $S_1$ and $S_2$. Notice that there is some "dead time" when $S_1$ turns off prior to $S_2$ turning on. Outputs $S_1$ and $S_2$ must not be on at the same time. FIG. 2b shows results of no "dead time" where both switches can be on at the same time due to the finite time required to turn off. Without "dead time", during the transition time, both switches are on for a short time and drive current in opposite direction through the motor. This causes excess power dissipation and undesirable motor inefficiency. FIG. 2d depicts the "dead time" switching operation which eliminates the contention. Thus the utilization of "dead time" to control duty cycle results in power savings and higher efficiency.

Since we control motor speed, we also control torque and efficiency. In A.C. induction motors, speed/torque/efficiency is related to line voltage at the ratio of V/f—voltage divided by frequency. For example, at a line voltage of 240 vac and 60 Hz, the motor would rotate at 3600 RPM. Changing the motor requirements to run at 30 Hz (½ the frequency) would mean the motor would rotate at 1800 RPM (half the speed) but at greater torque and an increase in power dissipation. Reducing the voltage (by ½ to 120vac) would produce similar torque and power dissipation at the 1800 RPM rotation speed. The V/f ratio remains at ½. ($^{240}/_{60}=^{120}/_{30}=\frac{1}{2}$). If this ratio is not maintained, the torque at 30 Hz would be much higher than the torque at 60 Hz. Further, a considerable amount of power/heat would be wasted (in the motor) at 30 Hz.

Using our commutator, we can reduce the duty cycle at the lower frequency, by increasing "dead time" to keep torque essentially constant. We cannot easily change voltage but we can increase the "dead time" to reduce the current and power requirements keeping efficiency high. Reducing the duty cycle by increasing "dead time" is as effective as reducing the voltage. This duty cycle reduction is essentially the same as increasing "dead time" to a value (not just to eliminate contention) to minimize the excess power dissipation at reduced frequency drive. Thus controlling duty cycle by controlling "dead time" also allows more efficient operation at variable frequencies and motor rotation speeds.

Using the claimed herein technique, we can change frequency to change motor speed, change duty cycle (dead time) to control power requirements, and maintain efficiency at the lower frequency or lower rotational speeds.

Load is lower at the higher frequencies or higher rotational speeds. At "start-up", however, the load is high. Starting torque on small (shaded-pole, etc.) motors is quite low. We can start the motor at a lower frequency and then switch to a higher run frequency after the motor has started rotation and overcome the inertia at zero speed. Lower frequency results in more torque. For example, start a motor at 50 Hz for several cycles to overcome the initial inertia. Then switch to 60 Hz after the motor achieve certain speed. A lower starting frequency is desirable. Thus, we can control the frequency to match the load requirements at start up and afterward when the motor is running.

Also, with the present invention a user can readily maintain a constant rotational speed by monitoring it and providing a cooperative feedback circuit to adjust the switching frequency output of the motor controller. This can be accomplished by changing the duty cycle to compensate for slip losses. Thus, we can automatically control the motor speed to maintain it constant by counteracting changes in the load or slip losses.

Figure 3:
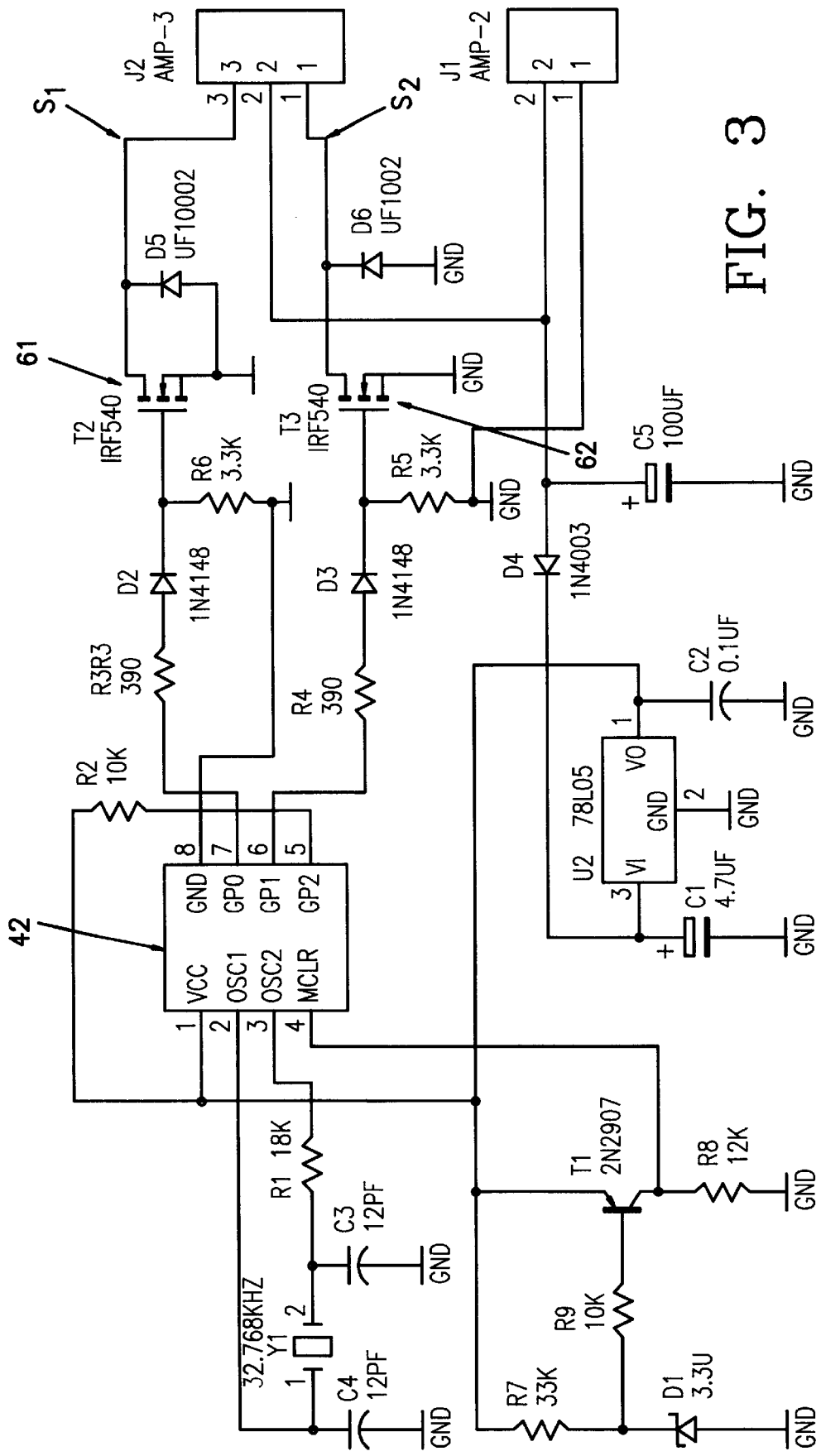
FIG. 3 is a representation of the switching circuitry used with a shaded pole motor.

In FIG. 3 we have a schematic of one of the preferred implementations of the present invention. Integrated circuit 42 is a 8-bit microcontroller manufactured by Microchip Technology, Inc. and located at Chandler, Ariz. Triggering signals are sent to the gates of power switching F.E.T. devices 61 and 62 with their collectors connected to pins 1 and 3 of jack J-2, respectively. The voltage at the outputs $S_1$ and $S_2$ look like those represented in FIG. 2C.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A commutator for an A.C. shaded pole motor, comprising:
   a) a D.C. power source;
   b) a waveforming circuit connected to said D.C. power source and said waveforming circuit includes first and second outputs that provide interrupted complementary D.C. voltage triggering signals and one of said triggering signals having a duty cycle slightly smaller than the duty cycle of the other triggering signal so that the rising and falling edges of said triggering signals do not coincide in time with each other;
   c) power switching means including first and second power switch circuits controlled by said first and second triggering signals and further including third and fourth outputs; and
   d) a winding assembly on the stator of said motor having two ends and a centrally connected tap, said ends being connected to said third and fourth outputs so that opposite magnetic fields are included in said stator and alternate according to said triggering signals.

2. The commutator set forth in claim 1 wherein the triggering signal with the smaller duty cycle rises after a first predetermined dead time of the falling edge of the other triggering signal and said triggering signal with the smaller duty cycle falls a second predetermined dead time before the rising edge of the other triggering signal.

3. The commutator set forth in claim 2 wherein said first and second predetermined dead times are equal.

* * * * *